United States Patent
Catherall

(10) Patent No.: US 10,598,494 B2
(45) Date of Patent: Mar. 24, 2020

(54) METHOD AND APPARATUS FOR POSITION ESTIMATION

(71) Applicant: Raytheon Systems Limited, Harlow (GB)

(72) Inventor: Aled Catherall, Cambridge (GB)

(73) Assignee: Raytheon Systems Limited, Harlow (GB)

( * ) Notice: Subject to any disclaimer, the term of this patent is extended or adjusted under 35 U.S.C. 154(b) by 74 days.

(21) Appl. No.: 15/685,634

(22) Filed: Aug. 24, 2017

(65) Prior Publication Data

US 2018/0058856 A1 Mar. 1, 2018

(30) Foreign Application Priority Data

Aug. 26, 2016 (GB) .................................. 1614536.9

(51) Int. Cl.
 *G01C 21/16* (2006.01)
 *H04W 4/02* (2018.01)
 *H04W 48/04* (2009.01)

(52) U.S. Cl.
 CPC .......... *G01C 21/165* (2013.01); *H04W 4/023* (2013.01); *H04W 4/025* (2013.01); *H04W 48/04* (2013.01)

(58) Field of Classification Search
 CPC ........... G01C 21/165; G01C 21/12–18; H04W 4/023; H04W 4/025; H04W 48/04; H04W 64/00
 USPC ........................................................ 701/472
 See application file for complete search history.

(56) References Cited

U.S. PATENT DOCUMENTS

| 5,724,265 | A | 3/1998 | Hutchings | |
|---|---|---|---|---|
| 5,899,963 | A | 5/1999 | Hutchings | |
| 6,122,960 | A | 9/2000 | Hutchings et al. | |
| 6,305,221 | B1 | 10/2001 | Hutchings | |
| 7,414,575 | B2 * | 8/2008 | Watanabe | G01S 19/53 342/357.37 |
| 2009/0005070 | A1 * | 1/2009 | Forstall | G01C 21/12 455/456.1 |
| 2014/0232570 | A1 * | 8/2014 | Skinder | G01C 21/165 340/989 |

(Continued)

FOREIGN PATENT DOCUMENTS

| WO | WO 2010/062179 A1 | 6/2010 |
|---|---|---|
| WO | WO 2016/094681 A1 | 6/2016 |

OTHER PUBLICATIONS

Response (with Amended Claims) to Great Britain Combined Search and Examination Report dated Feb. 9, 2017 for Great Britain Application No. GB1614536.9; Response filed Oct. 29, 2018; 19 Pages.

(Continued)

*Primary Examiner* — Krishnan Ramesh
(74) *Attorney, Agent, or Firm* — Daly Crowley Mofford & Durkee, LLP

(57) ABSTRACT

A method and apparatus for improving a dead reckoning estimate of a mobile unit is described. When an accurate position cannot be determined for a mobile unit, for example if GPS is unavailable, a dead reckoning estimate can be improved when two or more mobile units share their position estimates and the shared position estimates are used with either the range between the two units or knowledge that the units are within a threshold distance of each other to refine the position estimate of at least one unit.

6 Claims, 12 Drawing Sheets

(56) References Cited

U.S. PATENT DOCUMENTS

| | | | | |
|---|---|---|---|---|
| 2015/0098442 | A1* | 4/2015 | Shatsky | G01C 21/165 |
| | | | | 370/331 |
| 2015/0230055 | A1* | 8/2015 | Smith | H04W 4/029 |
| | | | | 455/456.3 |
| 2016/0187153 | A1* | 6/2016 | Johnson | G16H 40/63 |
| | | | | 701/500 |
| 2016/0272196 | A1* | 9/2016 | Hocking | B60W 30/02 |
| 2016/0291164 | A1* | 10/2016 | Jordan | G01S 19/31 |
| 2016/0349362 | A1* | 12/2016 | Rohr | G01S 13/86 |
| 2018/0020329 | A1* | 1/2018 | Smith | H04W 4/029 |
| 2018/0045519 | A1* | 2/2018 | Ghadiok | G06F 16/5866 |
| 2018/0106618 | A1* | 4/2018 | Cerchio | H04W 4/33 |

OTHER PUBLICATIONS

Great Britain Combined Search and Examination Report dated Feb. 9, 2017 for Great Britain Application No. GB1614536.9; 8 Pages.
Great Britain Intention to Grant dated Sep. 27, 2019 for Great Britain Application No. GB1614536.9; 2 Pages.

* cited by examiner

METHOD AND APPARATUS FOR POSITION ESTIMATION

CROSS REFERENCE TO RELATED APPLICATIONS

This application claims priority under 35 U.S.C. § 119 to UK Application No. GB1614536.9 filed on Aug. 26, 2016, the contents of which are herein incorporated by reference in their entireties.

FIELD OF INVENTION

The present invention provides a method and apparatus for determining a position of a mobile unit. In particular, the invention estimates the location of a mobile unit when an accurate position fix is unavailable or inaccurate by supplementing a dead reckoning estimate for a first mobile unit with positional information from one or more additional mobile units to refine the dead reckoning estimate. The accurate position fix may be determined for example from a global navigation satellite system, wifi hotspot or manually entered accurate position fix or any other method distinct from the dead reckoning estimation.

BACKGROUND OF THE INVENTION

Global Navigation Satellite Systems (GNSS) such as Global Positioning System (GPS) are widely used in order to provide accurate location information to support navigation. However, GNSS is not always available or it can be severely degraded, for example inside buildings, underground or when it is actively jammed. In these circumstances other technologies are required in order to provide an accurate real-time estimate of an individual's location to both the user and to an external observer. Example applications include firemen working in reduced visibility inside buildings which are on fire and special forces soldiers conducting a night-time raid in a large and complex building. In both cases the individuals need accurate information on their position or location as do any commanders outside the building overseeing activities.

One approach to estimating location in the absence of GNSS is to utilise dead-reckoning. A dead-reckoning system attempts to determine an object's location through estimating the displacement from a known starting point. This is usually achieved through the integration of sensor data over time.

An example dead-reckoning system is described by Hutchins (U.S. Pat. Nos. 5,724,265; 5,899,963; 6,122,960; 6,305,221) and involves the emplacement of inertial sensors (accelerometers and gyroscopes) within an individual's shoe. By integrating the accelerometer and gyroscope data over time, the displacement of the shoe from a known start point can be estimated. The location is displayed on a wristwatch wirelessly connected to the shoe-mounted navigation system.

The positional accuracy of such dead-reckoning systems, however, tends to degrade with both time and distance traveled due to the accumulation of errors. This limits their applicability, especially when high positional accuracy is required over a long period of time, or distance traveled, or both.

SUMMARY OF THE INVENTION

The invention is defined in the claims to which reference is now directed. Preferred features are set out in the dependent claims.

When an accurate position fix or location is not available, an improvement in a position or location estimate determined by dead reckoning can be provided by allowing two or more mobile navigation units to share their estimates of position. In a first embodiment, when the range between two mobile units is not accurately known, the position estimation refinement process is limited to mobile units which detect they are within a threshold distance of each other. In a second embodiment, when the range between two mobile units can be determined accurately, the refinement process is based on the determined range and position estimates of the two mobile units. Preferably, uncertainty in the dead reckoning position estimate or estimates and/or in the determined range is used in the refinement of the dead reckoning estimate.

DESCRIPTION OF PREFERRED EMBODIMENTS

In general this disclosure relates to two or more navigation systems communicating wirelessly with one another to share their estimates of position determined using dead reckoning and to improve those estimates. Improvement or refinement of the dead reckoning estimates uses one or more of: the uncertainty in one or more position estimates, a threshold distance between two mobile units, the range between two mobile units and an accuracy or error in the range measurement. A weighted average algorithm, such as a Kalan filter, may be employed in order combine the different information together to yield a more accurate estimate.

Figure 1:
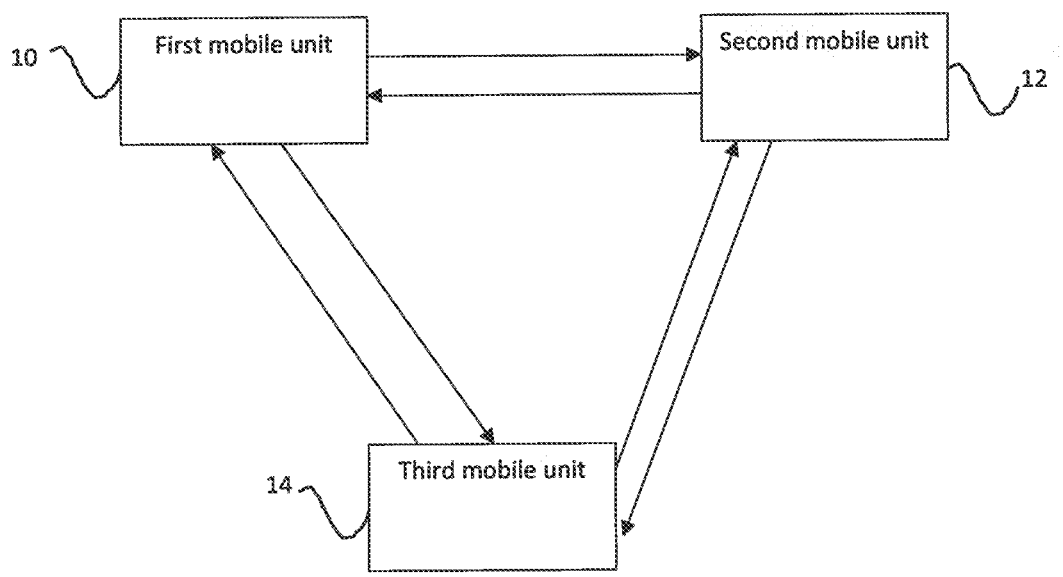
FIG. 1 is a schematic diagram of a co-operative navigation system according to a first embodiment of the invention.

FIG. 1 shows a plurality of mobile units 10, 12 and 14 which are each within a threshold distance, d, of each other. These mobile units may be paired, for example mobile unit 10 paired with mobile unit 12, mobile unit 12 paired with mobile unit 14, and mobile unit 10 paired with mobile unit 14. By using position information from the selected, first mobile unit 10 and a position estimate shared with the first mobile unit by a second mobile unit 12, the first mobile unit can improve its position estimate determined by dead reckoning. The second mobile unit 12 can also use the position estimate shared by the first mobile unit 10 to improve or refine its own position estimate. Thus, the first and second mobile units can be considered as paired in a refinement process operative at each mobile unit to improve the position estimates of both mobile units.

Figure 2:
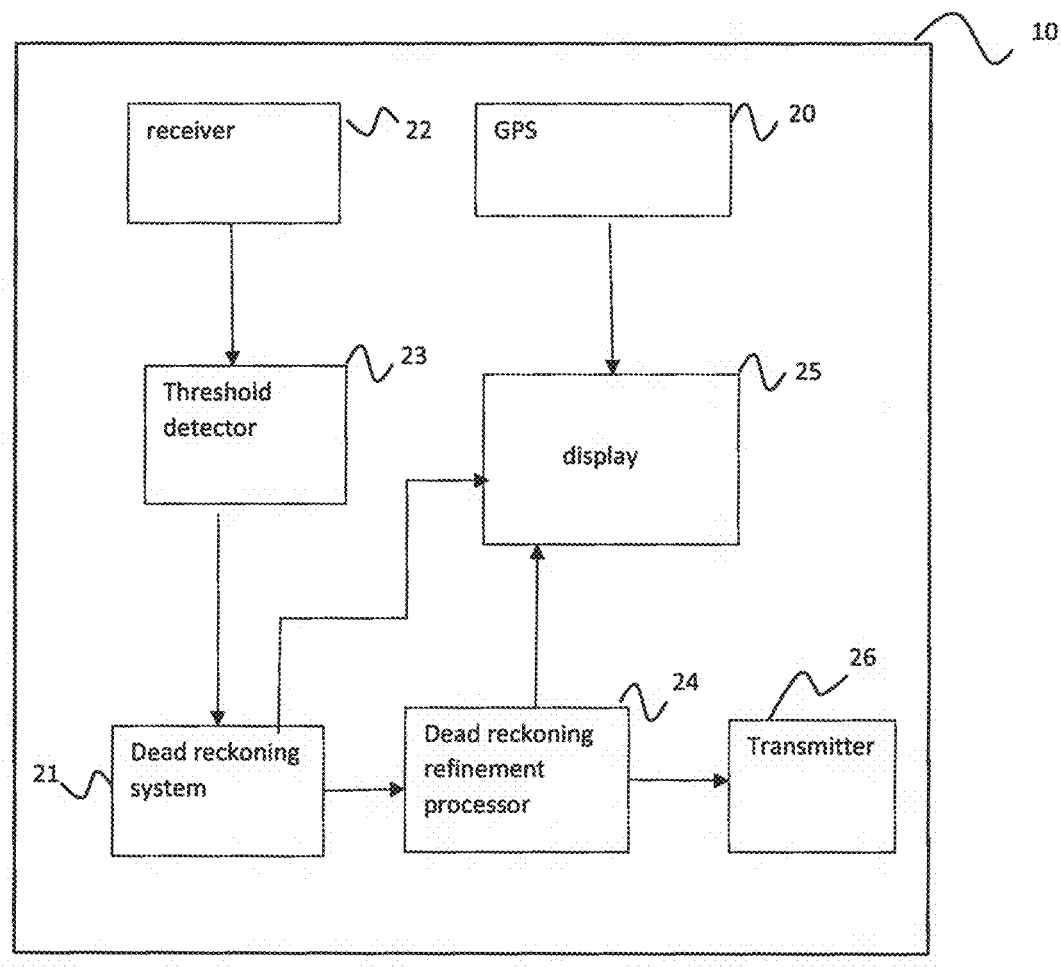
FIG. 2 is a block diagram of a first mobile unit according to the first embodiment of the invention.

A block diagram of an exemplary mobile unit 10 is shown schematically in FIG. 2. The mobile unit 10 includes a global navigation satellite system (GNSS) (such as Global Positioning System (GPS)) 20 to determine an accurate position fix or location for the mobile unit.

A dead reckoning system 21 is also provided in the mobile unit. The dead reckoning system 21 may operate continuously or may be initialised when positional accuracy or ability to determine a position fix is lost or compromised, for example when a GPS fix cannot be obtained due to the local environment, jamming etc. For commercial dead reckoning navigation systems, the accuracy is often quoted on an accompanying data sheet as being function of both time and the measured distance traveled.

Mobile unit 10 also includes a receiver 22 allowing data to be received from other mobile units and a transmitter 26 allowing data to be transmitted to other mobile units. Data received by the mobile unit 10 may include a position estimate provided by another mobile unit, such as second mobile unit 12, and an estimate of the accuracy of the second mobile unit position estimate also provided by the second mobile unit 12. Similar data may be received by receiver 22 from one or more other mobile units, e.g. third mobile unit 14. Mobile unit 10 transmits data representing its position estimate and its estimate of the accuracy of its position estimate to one or more other mobile units, eg mobile units 12 and/or 14, for use by the other mobile units in their own position estimation.

A threshold detector 23 may be coupled to the receiver 22 and may determine from the position of the second mobile unit and its own position (whether from an accurate position fix for example a GPS position fix or from its own dead reckoning position estimate) whether the first and second mobile units are within a threshold distance (e.g. five metres) of each other. When the threshold detector determines that the first and a second mobile unit are within the threshold distance of each other, refinement of the dead reckoning estimate of the position of the first mobile unit is initiated as described in detail below.

A position of the first mobile unit is reported either by transmitting the position to a monitoring station via transmitter 26 and/or by displaying the position on a display 25 provided on, or coupled to, the mobile unit. A proximity detector (not shown in FIG. 2), may be provided to enable the first mobile unit to determine that a second mobile unit is close to the first mobile unit and within range for position estimate refinement. The proximity detector may use Bluetooth LE received signal strength for example to determine that the first and second mobile units are in close enough proximity. Alternatively, the first mobile unit can use its position and the position of the second mobile unit transmitted by the second mobile unit and received by the first mobile unit to determine whether the second mobile unit with within the threshold distance for position estimation refinement. Preferably, proximity detection may be determined at various intervals (e.g. continually, once per second, once per hour or on a random basis). An accurate knowledge of the range to the second mobile unit is not required so that a simpler and cheaper proximity detector may be provided.

A display unit 25 associated with the mobile device or in each individuals possession may display the position estimate determined by the mobile unit. When an accurate position, e.g. via GPS, is available, the accurate position is displayed, for example the displayed position is derived from the GPS module. However, when the group of individuals enter a region where no accurate position fix is available and their position relative to the point where the accurate position fix was lost is estimated via dead reckoning (or a combination of dead reckoning and GPS if GPS is available but severely degraded), each mobile unit may estimate its range from one or more other mobile units. When a pair of mobile units, e.g. a first mobile unit and a second mobile unit, are estimated to be within a predefined threshold distance of one another (e.g. 5 m) they share their positional estimates and preferably also share their estimates of uncertainty in those positional estimates. Multiple pairs of mobile units may share positional estimates and estimates of uncertainty. Each mobile unit uses the shared information and their own estimate of position and uncertainty, together with the knowledge that they are within the threshold distance of one another, in order to update their position estimate. The technique is most effective when the positional uncertainty of each device is large in comparison to the threshold distance. The threshold distance may be constant and the same for each mobile unit, or could differ between mobile units or change with time (for example to match the position uncertainty which will change with time).

The first mobile unit reports its position as its accurate position fix, for example its GPS position, when this is available. When an accurate position fix is not available, is detected or determined to be inaccurate or compromised, either the refined dead reckoning estimate or the dead reckoning estimate may be reported and/or displayed. The refined dead reckoning estimate is preferably displayed when the accurate position fix is not available but in circumstances where this is not available or deemed unsuitable (for example because the accuracies of the position estimates from the first and/or second mobile unit are outside an allowed range or threshold) the reported position estimate may be the (unrefined) dead reckoning position estimate.

This embodiment works best when the threshold distance is relatively small, that is when mobile units are located, and remain, relatively close to one another.

When the refinement process is carried out remotely from the first mobile unit in a separate, remote processor, either the first mobile unit or the second mobile that are within a threshold distance of each other transmits this information to the remote processor which triggers the remote processor to request from both units, or a remote monitoring station, position estimates of the first and second mobile units and the remote processor determines the refined position estimates which can be subsequently reported back to the units and/or to a monitoring station. Communication and processing latency for this remote processing alternative must be sufficiently small so that the mobile units will not have moved significantly during the position refinement calculation and reporting process. When it is carried out remotely from the mobile units, the refinement process may be carried out by a monitoring station which also reports the refined positions for example by displaying the refined positions on a map or as co-ordinates.

The scope of the invention is not limited to the preferred embodiment and some alternatives to various elements are discussed below.

Alternative methods of providing an accurate position fix may be provided. For example, a user may enter a starting location as an accurate position fix or the mobile unit may be configured to use other information, for example using the location of a wifi hotspot to determine an accurate position fix or using a received signal strength in conjunction with heatmap type signal strength data stored in, or provided to, the mobile unit. In certain environments the GPS, or other means of determining an accurate position fix, may be unable to determine a position of the mobile unit or the accuracy of the position may be compromised.

The transmitter 26 and receiver 22 may be a transceiver, part of a wireless communication module or may be separate components in the mobile unit. The receiver and transmitter 26 may be part of a wireless communication module which may also transmit position data and data representing the accuracy (or alternative the uncertainty) in the estimated position data from the first mobile unit to other mobile units such as mobile units 12 and 14 and/or to a remote monitoring system. Thus, the wireless communication module enables mobile units to communicate with one another and exchange information.

The threshold detector 23 may alternatively be coupled to additional equipment such as a wireless range measurement module (not shown) which may estimate or measure the range from the first mobile unit 10 to one or more further mobile units e.g. second mobile unit 12 and/or third mobile unit 14.

As an alternative to each or all mobile units performing the refinement calculation, the position estimate refinement process for one, more or all mobile units could be performed by a separate and remote device. For example, if a first mobile unit 10 determined it was within a threshold distance of a second mobile unit 12, the first mobile unit 10 could be configured to send its position estimate and accuracy estimate data to a separate refinement processor. Receiving the data from the first unit may trigger the separate refinement processor to request from the second mobile unit 12 data concerning its position estimate and accuracy estimate. The separate refinement processor could then perform the refinement calculations to determine improved position estimates for both the first and second mobile units which could then be provided to the first and second mobile units. Use of separate refinement processing apparatus remote from the first and second mobile units would be reliant on the communication and processing latency being sufficiently small that the mobile units will not have moved significantly during the process.

Not all the mobile positioning units may include a transmitter. Some units may have reduced functionality and merely receive data transmitted by other full functionality units. Such reduced functionality units could not pair with each other to cooperatively refine their position estimates but each transmitter-less unit would require a full functionality mobile unit as a paired unit in order to perform position refinement.

In an exemplary scenario, each individual in a group of individuals carries a mobile unit according to the first embodiment of the invention. The dead-reckoning device 21 may for example be a shoe-mounted dead-reckoning navigation system as described by U.S. Pat. No. 5,724,265. The receiver 22 may be part of a wireless communication link.

Figure 3:
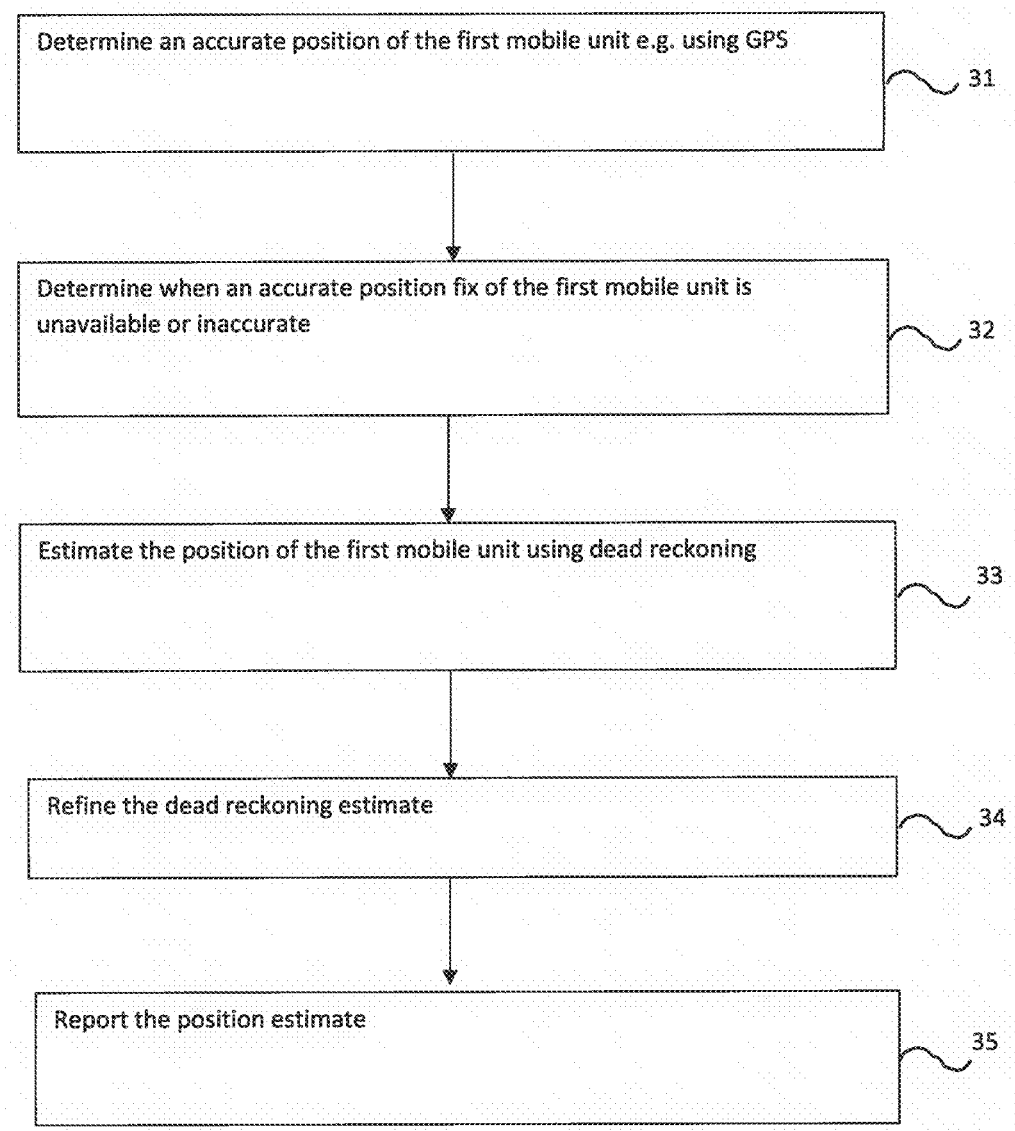
FIG. 3 is a functional block diagram showing the basic steps in a method according to the first embodiment of the invention.

FIG. 3 shows a schematic block diagram of a method 30 of determining and reporting a refined dead reckoning estimate in accordance with the first embodiment of the invention. In the first embodiment, the mobile unit uses knowledge that it is within a predetermined distance of at least a second mobile unit to refine its position estimate. The mobile unit does not require an accurate range to the second mobile unit and can use, for example, signal strength of a signal received from the second mobile unit as a simple, low cost method of detecting that the second mobile unit is within the threshold distance required for the refinement process to be initiated. At step 31 an accurate position of the first mobile unit is determined, for example using a global navigation satellite system such as GPS. At step 32 a determination is made whether the accurate position fix is unavailable or inaccurate, for example when a GPS signal is lost due to terrain, in a built up area, indoors or due to active jamming or spoofing. When a suitable accurate position fix is unavailable, at step 33 the first mobile unit estimates its position using dead reckoning. The dead reckoning estimate may be refined at step 34. At step 35 the position of the first mobile unit is reported, for example by transmitting it to a remote monitoring station and/or displaying it on a display on or coupled to the first mobile unit and/or transmitting it to one or more other mobile units.

Figure 4:
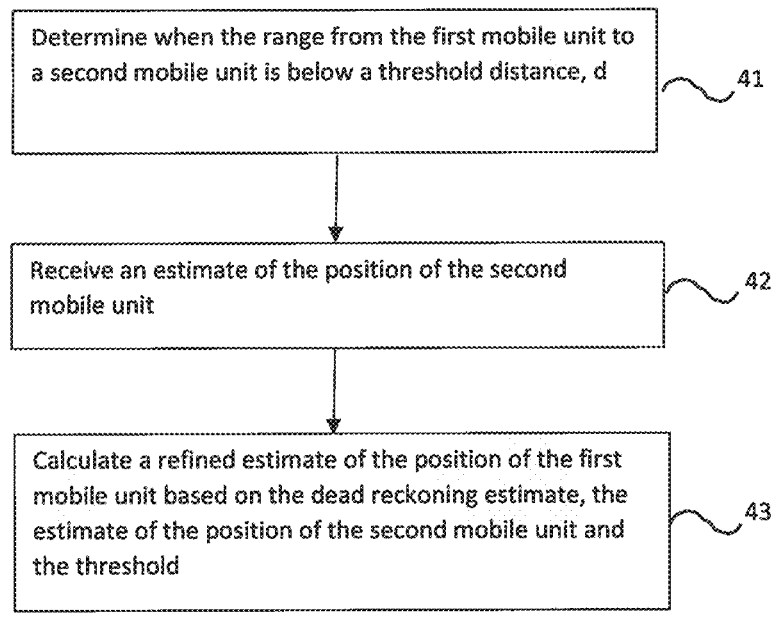
FIG. 4 is a block diagram showing additional detail of the dead reckoning refinement step of FIG. 3.

FIG. 4 shows schematically the basic steps for refining the dead reckoning estimate according to the first embodiment of the invention. At step 41, a refinement processor determines that the range between the first mobile unit and a second mobile unit is below a threshold distance, d, and then uses an estimated position of the second mobile unit received from the second mobile unit, the dead reckoning estimate determined by the first mobile unit and the threshold distance, d, to refine its dead reckoning estimate.

In this embodiment, once a first mobile unit has determined that it is within a threshold distance of a second mobile unit, the first and second mobile units may share information on their respective estimated positions.

Let us consider two mobile units, labelled a and b and assume that the true position, P, of each device is given by equation (1) below where x and y represent the lateral components of the true position relative to an origin and z represents vertical displacement or altitude relative to the origin and i, j and k are unit vectors in Cartesian coordinates. Whilst the lateral x and y components may be derived via dead reckoning and hence have a limited accuracy, the altitude (vertical or z component) may be determined for example via a barometer measuring air pressure and consequently may be more accurate than the x and y estimates. In this instance, the refinement may be applied only to the x and y positions and not the z position.

$$P_a = x_a i + y_a j + z_a k$$

$$P_b = x_b i + y_b j + z_b k \quad (1)$$

The positions of the mobile units according to their internal dead-reckoning estimates are given by equation (2):

$$P^*_a = x^*_a i + y^*_a j + z^*_a j$$

$$P^*_b = x^*_b i + y^*_b j + z^*_b k \quad (2)$$

If the mobile units are determined to be within a threshold distance d of one another, they will share their estimates of position, P*, and their estimates of their accuracy e (which is assumed to be a scalar error). The value for e could be based on the stated accuracy of the dead-reckoning device, often a percentage of estimated distance traveled.

The weighted average of the estimated positions of the first and second mobile units is given by.

$$P^{**}_{a,b}=(P^*_a/e_a+P^*_b/e_b)/(1/e_a+1/e_b) \quad (3)$$

Thus $P^{}$ will lie closest to the mobile unit with greatest accuracy (or least uncertainty). New estimates of position for the two mobile units can then be given by a weighted sum of their estimated position and $P^{}_{a,b}$:

$$P^{**}_a=(P^*_a/e_a+P^{**}_{a,b}/d)/(1/e_a+1/d) \quad (4)$$

and $$P^{**}_b=(P^*_b/e_b+P^{**}_{a,b}/d)/(1/e_a+1/d) \quad (5)$$

Where $P^{}_a$ and $P^{}_b$ are the new, refined dead reckoning derived position estimates for at least the lateral, x and y, components of the position of mobile units a and b respectively.

Thus each mobile unit derives a new estimate which lies along the line joining its initial estimate and the weighted average position of the paired mobile units. When e is small in comparison to d, the new, refined estimate in position will lie close to the initial estimate. When e is large in comparison to d, the new estimate will lie close to the weighted average position. Refining the position estimate may not be automatic. For example, should the uncertainty or accuracy, e, of one mobile unit of the paired mobile units fall below some threshold value in relation to the threshold distance, d, the mobile unit may skip the refinement or may revert to reporting the original (unrefined) dead reckoning estimate.

The method described above can be extended to any number of devices, or iteratively repeated between each pair of devices which are within the threshold distance of one another. For example, consider 3 units a, b, and c which all fall within a threshold distance d of one another. The weighted average of the estimated positions of the first, second and third mobile units is given by:

$$P^{**}_{a,b,c}=(P^*_a/e_a+P^*_b/e_b+P^*_c/e_c)/(1/e_a+1/e_b+1/e_c) \quad (6)$$

New estimates of position for the three mobile units can then be given by a weighted sum of their estimated position and $P^{**}_{a,b,c}$:

$$P^{**}_a=(P^*_a/e_a+P^{**}_{a,b,c}/d)/(1/e_a+1/d)$$

$$P^{**}_b=(P^*_b/e_b+P^{**}_{a,b,c}/d)/(1/e_b+1/d)$$

$$P^{**}_c=(P^*_c/e_c+P^{**}_{a,b,c}/d)/(1/e_c+1/d) \quad (7)$$

Where $P^{}_a$, $P^{}_b$ and $P^{**}_c$ are the new, refined dead reckoning derived position estimates for at least the lateral, x and y, components of the position of mobile units a, b and c respectively.

Figure 5:
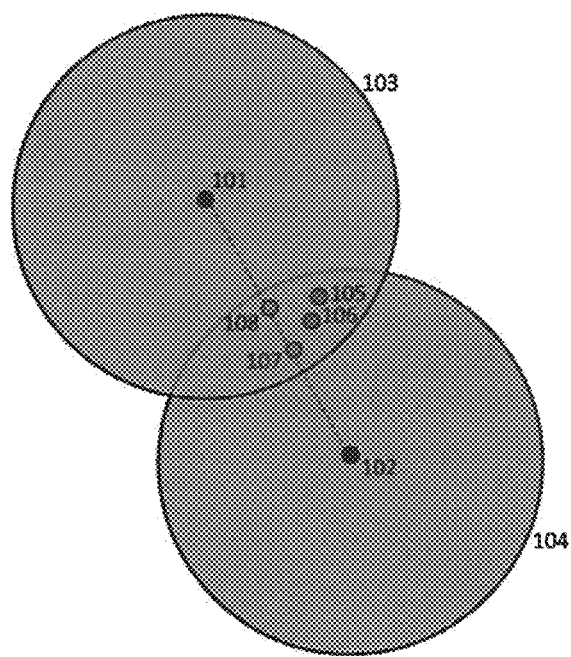
FIG. 5 is a schematic diagram showing the refinement of the dead reckoning estimate of the location of two mobile units in accordance with the first embodiment of the invention.

In FIG. 5, two mobile units or dead reckoning navigation systems report their positions as given by 101 and 102. The mobile units or dead reckoning systems each also estimate their uncertainty (or alternatively their accuracy) of the dead reckoning position estimate, given in FIG. 5 by the circles 103 and 104. The true position of the individuals may differ from the dead reckoning estimates 101 and 102 as shown for example in FIG. 5 as positions 105 and 106. One (or both) mobile units determine that they are within a threshold distance from one another, and share information on position and uncertainty. The positional information may be provided when the two mobile units determine that they are within a threshold distance of each other or may be periodically, randomly or continuously broadcast.

The two mobile units then may each use the shared information to refine their own position estimate as described in more detail below. The new estimates of their position may be given by 108 and 107. The new estimate of positions 107 108 are more accurate than the original estimates 101,102 prior to sharing information. In the example given in FIG. 5, the two dead reckoning systems have similar uncertainties (shown by the circles 103, 104 having the same diameter) and the updated positions lie close to the midpoint between the two mobile units. However, one mobile unit may have less uncertainty than the other, particularly if it has remained static since its last accurate position, e.g. GPS, fix. In this instance, the updated position estimate for both mobile units will be biased towards the estimated position of the mobile unit with the more accurate (less uncertain) position estimate.

Figure 6:
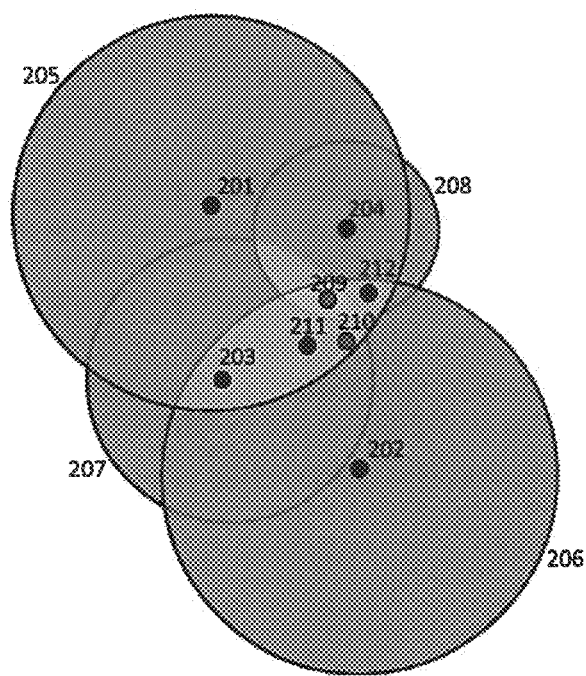
FIG. 6 is a schematic diagram showing the dead reckoning estimates for four mobile units which are within a threshold distance of each other.
Figure 7:
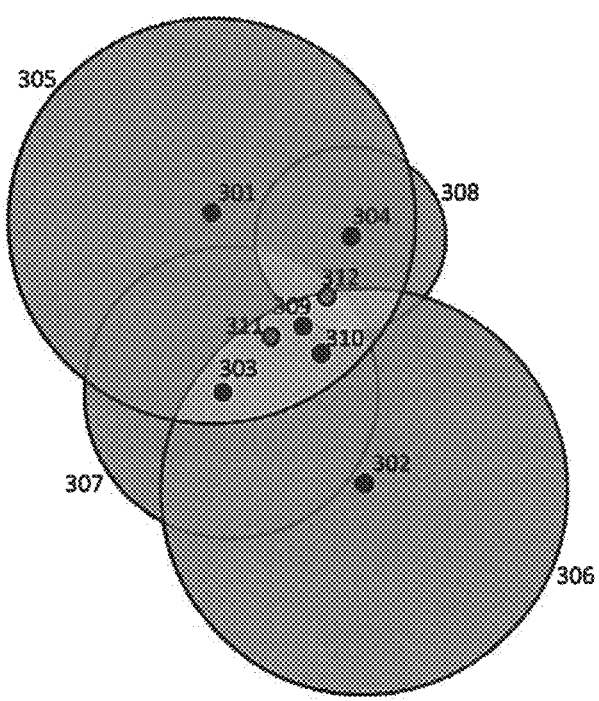
FIG. 7 is a schematic diagram showing refined estimates for the four mobile units of FIG. 6 after pairing the mobile units and using respective position estimates to refine the dead reckoning estimates.

FIGS. 6 and 7 depict a situation where 4 individuals each carrying a mobile unit are all measured to be within the threshold distance of one another. The estimated positions of the four individuals are given by 201, 202, 203 and 204 whilst their uncertainty is given by 205, 206, 207 and 208 respectively. The true position of the individuals is given by 209, 210, 211 and 212 respectively. Following the sharing of information, as shown in FIG. 7, the navigation systems each produce a new estimate of position which is given by 309, 310, 311 and 312 respectively.

A second preferred embodiment will now be described in which a plurality of mobile navigation units accurately measure their range from one another and share their positional estimates and estimates of their uncertainty. This second embodiment requires that a mobile unit be able to determine its range accurately to at least a second mobile unit to be able to refine its position estimate; it is not enough for the mobile unit to know that it is closer than a threshold to a second mobile unit.

Figure 8:
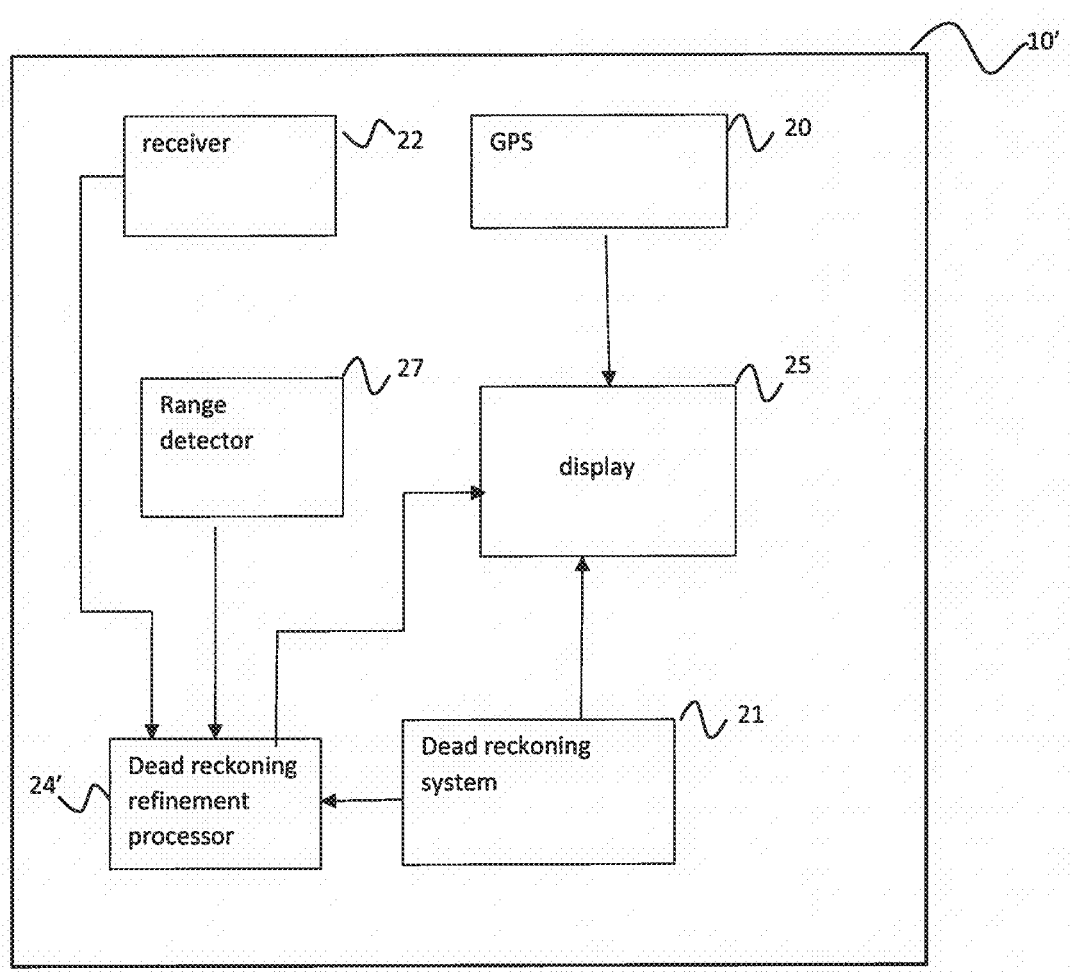
FIG. 8 is a block diagram of a first mobile unit according to a second embodiment of the invention.

FIG. 8 shows a block diagram of an exemplary mobile unit 10' according to the second preferred embodiment. Like components to the first mobile unit 10 of the first preferred embodiment are denoted with like reference numerals.

In the presently preferred embodiment, the mobile unit 10' includes a global navigation satellite system (GNSS) (such as Global Positioning System (GPS)) 20 to determine an accurate position fix or location for the mobile unit. In certain environments the GPS may be unable to determine a position of the mobile unit or the accuracy of the position may be compromised, for example by jamming or spoofing.

A dead reckoning system 21 is also provided in the mobile unit. The dead reckoning system 21 may operate continuously or may be initialised when the accurate position fix is no longer available, for example when GPS loses positional accuracy or ability to determine a position. For commercial dead reckoning navigation systems, the accuracy is often quoted on an accompanying data sheet as being a function of both time and the measured distance traveled.

Mobile unit 10' also includes a receiver 22 allowing data to be received from other mobile units. Data received by the mobile unit 10' may include a position estimate provided by another mobile unit, such as second mobile unit 12, and an estimate of the accuracy of the second mobile unit position estimate also provided by the second mobile unit 12. Similar data may be received by receiver 22 from one or more other mobile units, e.g. third mobile unit 14. The mobile unit 10' may include a transmitter (not shown) for transmitting data, such as position data and data representing the accuracy (or alternative the uncertainty) in the estimated position data, from the first mobile unit to other mobile units such as mobile units 12 and 14 and/or to a remote monitoring station. The transmitter and/or receiver may be separate components or may be part of a wireless communication module which enables mobile units to communicate with one another and exchange information. A transceiver may be provided in place of separate transmitter and receiver.

A range detector 27, such as a wireless range measurement module, estimates or measures the range from the first mobile unit 10 to one or more further mobile units e.g. second mobile unit 12 and/or third mobile unit 14. The measured range is used in the refinement process 24' to improve the dead reckoning estimate of the position of the first mobile unit. The range may be estimated at various intervals (e.g. continually, once per second, once per hour or on a random basis) using a wireless technology (e.g. radio frequency, acoustic, optical, magnetic). Range between any two navigation systems may be estimated from the time of flight to complete a round trip between navigation systems, the received signal strength or one of the other established techniques for short range distance measurement or proximity detection.

A position of the first mobile unit 10' is reported either by transmitting the position to a monitoring station via transmitter (not shown) and/or by displaying the position on a display unit 25 provided on, or coupled to, the mobile unit. When accurate GPS is available, the displayed position is derived from the GPS module. However, when the group of individuals enter a region where no GPS is available and their position relative to the point where GPS was lost is estimated via dead reckoning (or a combination of dead reckoning and GPS if GPS is available but severely degraded), each mobile unit may estimate its range from one or more other mobile units. When a pair of mobile units, e.g. a first mobile unit and a second mobile unit, are estimated to be within a predefined threshold distance of one another (e.g. 5 m) they share their positional estimates and preferably also share their estimates of uncertainty in those positional estimates. Multiple pairs of mobile units may share positional estimates and estimates of uncertainty. Each mobile unit uses the shared information and their own estimate of position and uncertainty, together with the range between the mobile units, in order to update their position estimate.

When the refinement calculation is carried out by a separate device remote from either the first or second mobile units, either the first or second, or both, mobile units transmits the range between the first and second mobile unit which, when received by the separate refinement device, triggers the device to request the position estimates of the first and second mobile units from the units themselves or from a remote monitoring station. Communication and processing latency for this remote processing alternative must be sufficiently small so that the mobile units will not have moved significantly during the position refinement calculation and reporting process.

Figure 9:
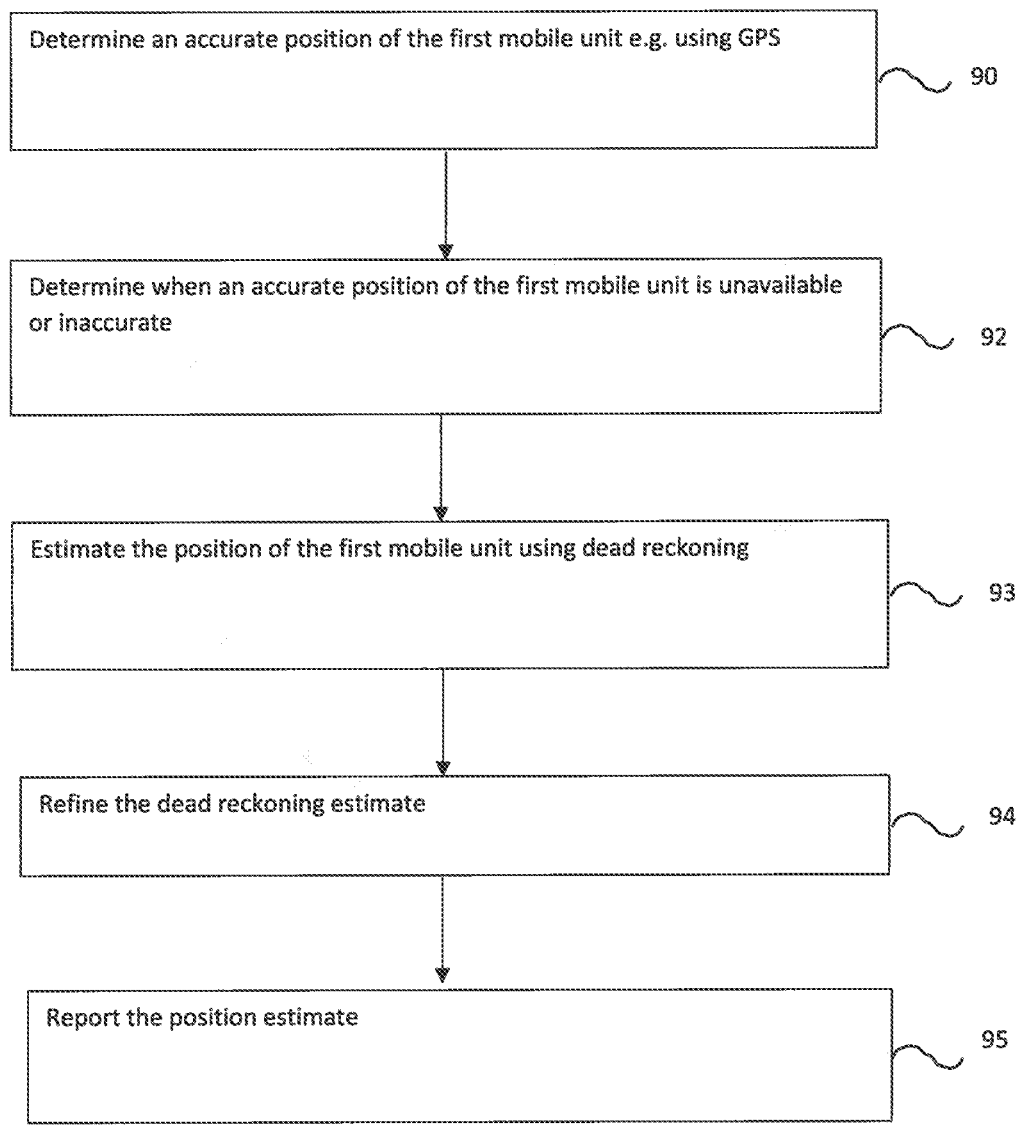
FIG. 9 is a functional block diagram showing the basic steps in a method according to the second embodiment of the invention.

FIG. 9 shows a schematic block diagram of a method 90 for determining and reporting a position estimate of the first mobile unit 10' in accordance with the second embodiment of the invention. At step 91 an accurate position of the first mobile unit is determined using, for example a global navigation satellite system such as GPS. At step 92 a determination is made whether the accurate position is unavailable or inaccurate. When an accurate position is unavailable, at step 93 the first mobile unit estimates its position using dead reckoning. The dead reckoning estimate may be refined at step 94. The refinement process is described in more detail below. At step 95 the position of the first mobile unit 10' is reported by transmitting it to a remote monitoring station and/or displaying it on a display on or coupled to the first mobile unit.

Figure 10:
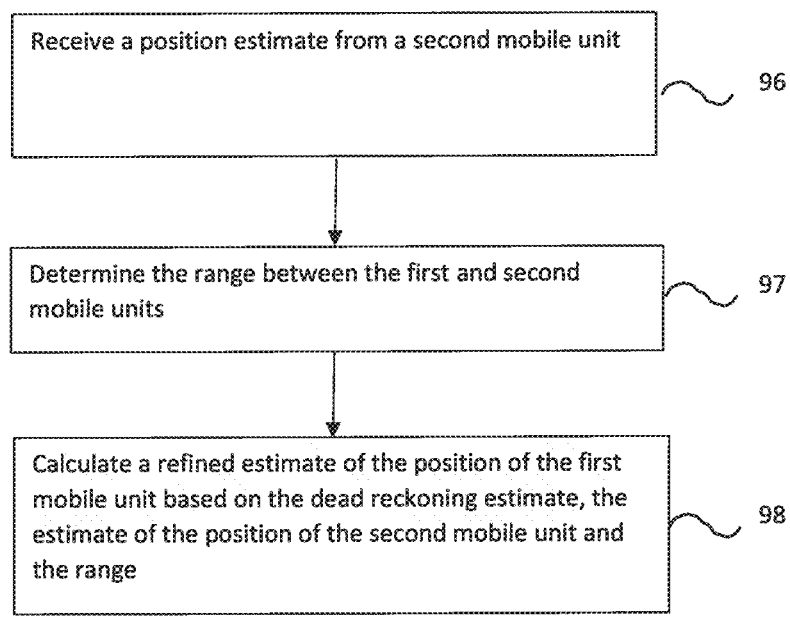
FIG. 10 is a block diagram showing additional detail of the dead reckoning refinement step of FIG. 9.

FIG. 10 shows schematically the basic steps for refining the dead reckoning estimate according to the second embodiment of the invention. At step 96, the refinement processor receives as an input data representing the position of a second mobile unit. At step 97, the refinement processor receives as an input data indicating the range between the first and second mobile units as measured by the first, second or both mobile units. The refinement processor is also provided with the dead reckoning position estimate of the first mobile unit and uses at least the range in conjunction with the position estimates of the first and second mobile units to refine the position estimate determined by the first mobile unit.

A preferred method of refining the dead reckoning position estimate according to the second embodiment will now be described. Let us consider two devices, labelled a and b. The true position, P, of each device is given by equation (1) (detailed above with respect to the first embodiment) and the estimated position, P*, based on each of their internal dead-reckoning devices is given by equation (2) (also detailed above with respect to the first embodiment).

The measured distance (e.g. from time of flight of a radio pulse) between the devices is given by $r_{a,b}$. A trial estimate for the position of device aj is at a distance $r_{a,b}$ from device b, along the vector which joins their internal estimates of position:

$$P'_{a,b} = x'_{a,b}i + y'_{a,b}j + z'_{a,b}k \qquad (8)$$

where $$x'_{a,b} = x^*_a + r_{a,b}\left(\frac{(x^*_b - x^*_a)}{\sqrt{(x^*_a - x^*_b)^2 + (y^*_a - y^*_b)^2 + (z^*_a - z^*_b)^2}}\right) \qquad (9)$$

and $$y'_{a,b} = y^*_a + r_{a,b}\left(\frac{(y^*_b - y^*_a)}{\sqrt{(x^*_a - x^*_b)^2 + (y^*_a - y^*_b)^2 + (z^*_a - z^*_b)^2}}\right), \qquad (10)$$

$$z'_{a,b} = z^*_a + r_{a,b}\left(\frac{(z^*_b - z^*_a)}{\sqrt{(x^*_a - x^*_b)^2 + (y^*_a - y^*_b)^2 + (z^*_a - z^*_b)^2}}\right), \qquad (11)$$

The new estimate for the position of device a is given by a weighted sum of its own estimate and the trial estimate:

$$P^{**}_a = (P^*_a/e_a - P'_{a,b}/(\hat{r}_{a,b}+e_b))/(1/e_a + 1/(\hat{r}_{a,b}+e_b)) \qquad (12)$$

where $\hat{r}_{a,b}$ is the error in the range estimate (usually a percentage of measured range) between a and b. The new position estimate for device b is calculated in the same way by swapping a and b terms in equations (9)-(12). The process can be expanded to any number of devices. For example, should a third device, c, be present the new estimate for device a would be given by $$P^{**}_a = (P^*_a/e_a + P'_{a,b}/(\hat{r}_{a,b}+e_b) + P'_{a,c}/(\hat{r}_{a,c}+e_c))/(1/e_a + 1/(\hat{r}_{a,b}+e_b) + 1/(\hat{r}_{a,c}+e_c)) \qquad (13)$$

Where $P'_{a,c}$ is calculated following the methodology in equations (9)-(11) but replacing terms labelled b with terms labelled c.

As in the first embodiment, in an alternative to each or all mobile units performing the refinement calculation, the position estimate refinement process for one, more or all mobile units could be performed by a separate and remote device. For example, a first mobile unit, unit a, could send, to a separate refinement processor, data indicating its position estimate, accuracy estimate and range to a second mobile unit. Receiving the data from the first unit may trigger the separate refinement processor to request from the second mobile unit data indicating its position estimate and accuracy estimate. The separate refinement processor could then perform the refinement calculations to determine improved position estimates for both the first and second mobile units which could then be provided to the first and second mobile units. Use of separate refinement processing apparatus remote from the first and second mobile units would be reliant on the communication and processing latency being sufficiently small that the mobile units will not have moved significantly during the process.

For either embodiment, alternative means for determining an accurate position fix may replace or supplement the GPS position fix. For example, an accurate position fix can be manually entered into the mobile unit by a user, transmitted to the mobile unit from a monitoring station or provided or determined in some other way.

Figure 11:
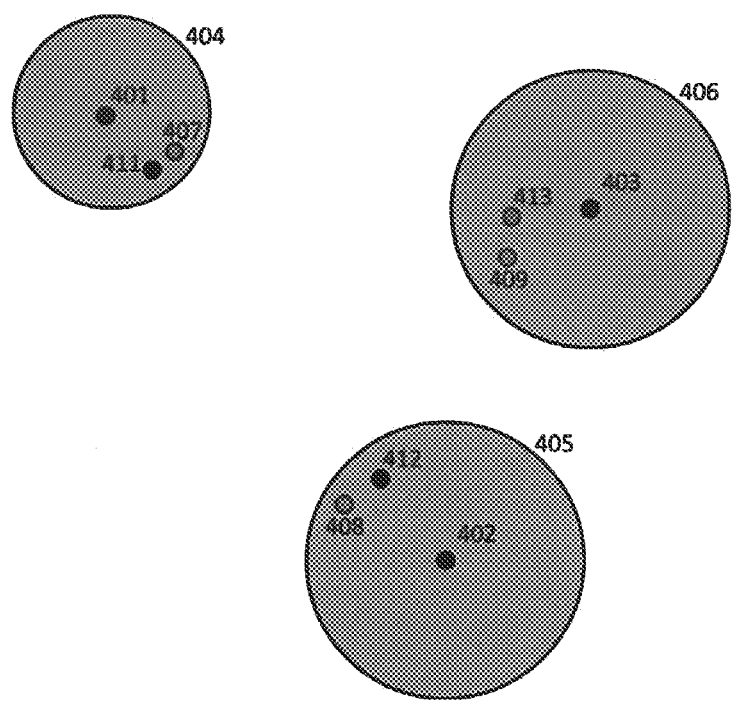
FIG. 11 is a schematic diagram showing the refinement of the dead reckoning estimate of the location of three mobile units in accordance with the second embodiment of the invention.

FIG. 11 schematically depicts dead reckoning refinement using co-operative navigation in accordance with the second embodiment. As shown in FIG. 11, three mobile units or navigation systems 401, 402 and 403 communicate with one another to share estimates of position and uncertainty. The mobile units also measure their range from one another. The uncertainties in the dead reckoning position estimate of each mobile unit are shown as circles given by 404, 405 and 406 respectively. The true positions are given by 407, 408 and 409 respectively. By combining the shared information and range measurements, each mobile unit derives a new position estimate shown by 411, 412 and 413 respectively. Whilst the first embodiment of the invention relies on the mobile units on different individuals being in relatively close proximity to one another, the second embodiment differs in that it does not rely on the mobile units being in close proximity but rather can work over any range provided that a communication link between the mobile units can be established to enable the sharing of information and that the range between units can be measured.

Updating the Internal Heading

Each time a mobile unit derives a new position update, by either of the methods described above with respect to the first or second embodiment, a new estimate for heading may also be derived.

Consider a mobile unit a, which has an accurate estimate, $P_0^*$, of position at point $P_0$ (e.g. due to a GPS fix) and time $t_0$. At a later time, t, and position, P, the device's knowledge of position is less accurate due to its use of dead reckoning technology. The device's position estimate at this time is P*. If at this point the device undergoes a position update from P* to P** through sharing of information with one or more other devices, its accuracy should be improved. The angular difference the vector joining $P_0^*$ and P*, and the vector joining $P_0^*$ and P** is given by $$\theta = \cos^{-1}\left(\frac{(P^* - P_0^*) \cdot (P^{**} - P_0^*)}{|P^* - P_0^*||P^{**} - P_0^*|}\right) \quad (14)$$

The yaw, or heading, estimate of the mobile unit is adjusted by an amount θ in order to realise an improved yaw estimate.

Figure 12:
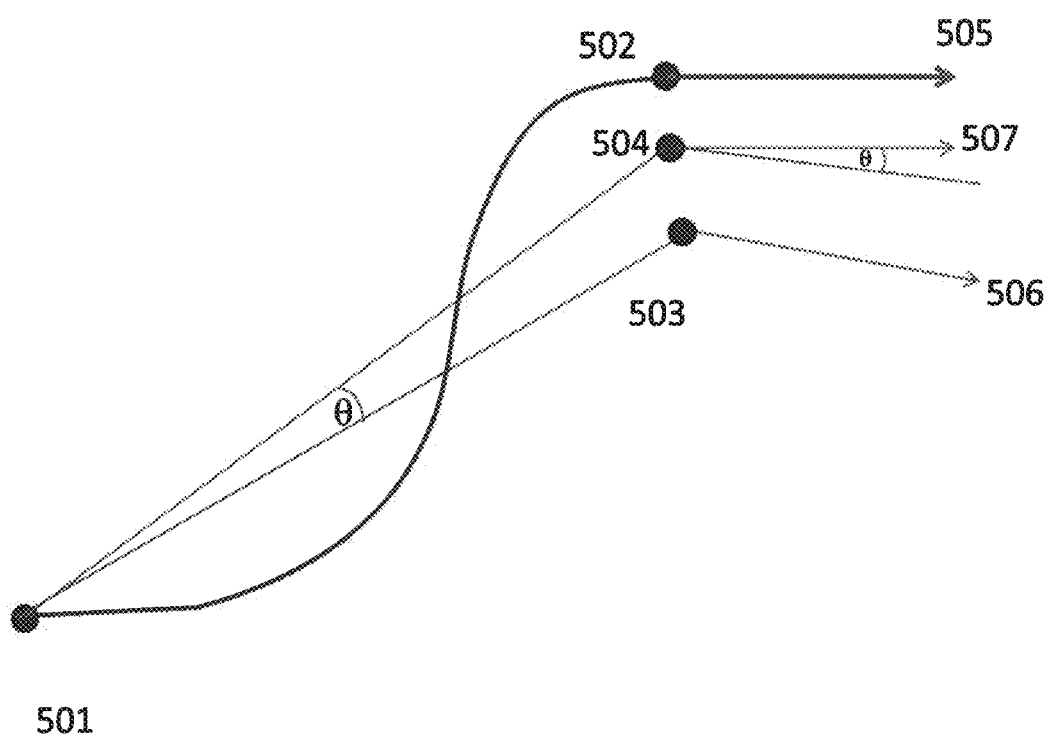
FIG. 12 is a schematic showing a method of updating a heading of a position estimate.

This is illustrated in FIG. 12. Here, 501 is the last position where an accurate knowledge of position was obtained by the device. 502 is the current position of the device. The curved line joining 501 and 502 depicts the route taken by the device. 503 represents the estimated position prior to sharing of position estimates with another device and 504 represents the estimated position following the sharing of position estimates with another device. 505 depicts the true yaw of the mobile unit, 506 is the estimated yaw prior to sharing of position estimates with another device and 507 is the estimated yaw following the sharing of position estimates.

Note that updating the internal heading of a mobile unit works best when the tortuosity of the route taken by the device between 501 and 502 is low.

With respect to the above description of both the first and second embodiments, it is to be realised that equivalent apparatus and methods are deemed readily apparent to one skilled in the art, and all equivalent apparatus and methods to those illustrated in the drawings and described in the specification are intended to be encompassed by the present invention. Therefore, the foregoing is considered as illustrative only of the principles of the invention. Since numerous modifications and changes will readily occur to those skilled in the art, it is not desired to limit the invention to the exact construction and operation shown and described and accordingly all suitable modifications and equivalents may be resorted to falling within the scope of the invention.

For example, for either of the first or second embodiments, there may be circumstances where a second mobile unit may be able to obtain an accurate, e.g. GPS, position fix and the position estimate provided by the second mobile unit to the first unit, and to other mobile units, would then be the accurate GPS position fix. If any one of a plurality of mobile units is able to obtain an accurate position fix, it may be preferable to pair a first mobile unit with only the mobile device having the accurate position fix when refining the position estimate of the first mobile unit. A first mobile unit may be paired successively with a plurality of different mobile units to successively refine the estimated position of the first mobile unit. An iterative process can alternatively or additionally be used by cycling through different mobile unit pairings more than once until the position estimates stabilise for one or more of the mobile pairings. Once an accurate position fix has been lost to a mobile unit, subsequent refinements of the position estimation may use the refined position estimate from the previous position/time interval in place of the dead reckoning estimate. The mobile units for either embodiment may be hand held or personnel mounted devices with a convenient display which may be separate from the processing unit. For either embodiment, the mobile units may be mounted on a vehicle or other moveable equipment. Scenarios where one or more mobile units are personnel mounted/handheld and one or more mobile units are vehicle or other moveable or mobile equipment mounted units are also envisaged and would function in the same manner described above. The position estimates shared with other mobile units could be provided by an intermediary, for example from a remote relay or monitoring station in communication with each mobile unit, for example to preserve mobile unit battery life or where encryption of the data is required to restrict access to position data from unauthorised units. The intermediary may act as a relay station merely receiving data from one or more mobile units and forwarding the data to other mobile units. The data which is transmitted from any mobile unit may be encrypted to prevent interception by receiving stations and other equipment which is not associated with transmitting mobile unit. Communication between any two mobile units need not be direct but may be via a separate service provider such as over a cellular network. A mobile unit may transmit its dead reckoning estimate to a remote station or service provider for determination of the refined position estimate which may be transmitted to the mobile unit for an internal update or may be reported to a separate monitoring station. The remote position refinement processing may be part of a remote monitoring station that both refines the position estimates and displays the refined position estimates. Not all units need to be mobile at all times. Some could be deliberately deployed and remain static for a period and thereafter become mobile again.

The invention claimed is:

1. A method for refining a position estimate of a moving first mobile unit and a position estimate of a moving second mobile unit comprising:
    receiving data indicating that the first and second mobile units are within a threshold distance of each other when GPS data is unavailable;
    receiving an estimated position of the first mobile unit, the estimated position determined by the first mobile unit using dead reckoning;
    receiving an estimated position of the second mobile unit when the second mobile unit is moving, the estimated position determined by the second mobile unit using dead reckoning;
    calculating a refined dead reckoning estimate of the position of the first mobile unit and a refined dead reckoning estimate of the position of the second mobile unit when the first and second mobile units are within a threshold distance of each other,
    wherein calculating the refined the dead reckoning estimates is based on the dead reckoning estimate of the position of the first mobile unit, the dead reckoning estimate of the position of the second mobile unit and the threshold distance; and wherein calculating a refined estimate of the position of the first mobile unit further comprises: calculating the refined estimate lying along the line joining the dead reckoning estimate of the first mobile unit and the average position of the first and second mobile units; and
    reporting the refined position of the first mobile unit and reporting the refined position of the second mobile unit.

2. The method of claim 1, further comprising:
    estimating an accuracy of the dead reckoning estimated position;
    receiving, from the second mobile unit, an estimate of the accuracy of the estimate of the position of the second mobile unit;
    wherein calculating, when the range from the first mobile unit to a second mobile unit is below the threshold, a refined estimate of the position of the first mobile unit further bases the refined estimate on the estimated accuracy of the dead reckoning estimate of the position of the first mobile unit and the estimate of the accuracy of the position of the second mobile unit.

3. The method according to claim 2, wherein calculating a refined estimate of the position of the first mobile unit calculates a weighted average refined estimate of the first mobile unit, $P^{**}_a$, as:

$$P^{**}_a = (P^*_a/e_a + P^{**}_{a,b}/d)/(1/e_a + 1/d)$$

where d is the threshold distance, $P^*a$ is the dead reckoning estimate of the position of the first mobile unit, $e_a$ is the accuracy of the dead reckoning estimate of the first mobile unit, $P^*_b$ is the position of the second mobile unit, $e_b$ is the accuracy of the position of the second mobile unit and $P^{**}_{a,b}$ is the weighted average of the estimated positions of the different devices given by:

$$P^{**}_{a,b} = (P^*_a/e_a + P^*_b/e_b)/(1/e_a + 1/e_b).$$

4. The method of claim 3, wherein calculating a refined estimate of the position of the first mobile unit performs the calculation of the refined estimate only when the accuracy of the dead reckoning estimate of the first mobile unit and/or the accuracy of the position of the second mobile unit are above an accuracy threshold related to the threshold distance.

5. The method of claim 4, wherein calculating a refined estimate of the position of the first mobile unit iteratively refines the estimate based on updated position estimates of the first and second mobile units.

6. The method of claim 5, wherein calculating the refined dead reckoning estimate of the position of the first mobile unit further comprises:
    determining when the range from the first mobile unit to a third or further mobile unit is below a threshold;
    receiving, from the third or further mobile unit, an estimate of the position of the third or further mobile unit;
    calculating, when the range from the first mobile unit to a further mobile unit is below the threshold, a further refined estimate of the position of the first mobile unit based on the dead reckoning estimate of the position of the first mobile unit, the estimate of the position of the third or further mobile unit and the threshold distance.

* * * * *